United States Patent [19]

Kays et al.

[11] 4,098,765

[45] Jul. 4, 1978

[54] PECAN NUT BY-PRODUCTS AND PROCESSES

[76] Inventors: Stanley J. Kays, 515 Milledge Heights, Athens, Ga. 30601; George V. Odell, P.O. Box 485, 11 Summit Cir., Stillwater, Okla. 74074

[21] Appl. No.: 792,702

[22] Filed: May 2, 1977

[51] Int. Cl.² ............................................. C09G 8/04
[52] U.S. Cl. ..................................... 528/1; 528/3
[58] Field of Search ............................................. 260/46

[56] References Cited

U.S. PATENT DOCUMENTS 2,198,378  4/1940  Ellis ................................. 260/46 X
3,376,191  4/1968  Reeves ........................... 424/286 X

OTHER PUBLICATIONS

Chem. Abstracts vol. 28, 5047$_4$, Thor et al. 1934.
Chem. Abstracts, vol. 35, 1941, 230$^5$, Phillips et al.
Chem. Abstracts, vol. 36, 1942, 4692$^{8-9}$, McElhinney et al.
Chem. Abstracts, vol. 38, 1944, 5018$^{2-4}$, Smith et al.

*Primary Examiner*—Howard E. Schain
*Attorney, Agent, or Firm*—Robert R. Keegan

[57] ABSTRACT

There are disclosed by-products of pecan nuts and processes for producing such by-products including products and processes involved in extracting water soluble phenolic constituents from the shell and packing tissue of the pecan to obtain a pecan nut shell extract (PNSE), reacting the PNSE with an aldehyde and an acid or a base catalyst resulting in the materials being condensed to form a highly cross-linked polymer which with thermal setting produces a phenol-formaldehyde resin (a Bakelite form of plastic). The plastics may be formed with lesser or greater density by control of conditions and may incorporate various fibers such as glass, asbestos or cellulose or non-fibrous filler material and may be cast, molded, extruded or otherwise formed into electrical insulation, laminated materials, particle or composition board, or thermal insulation.

25 Claims, No Drawings

PECAN NUT BY-PRODUCTS AND PROCESSES

The pecan, *Carya illinoensis* (Wang) K. Koch, is an important nut crop in the United States about which a substantial industry is centered. Approximately 200,000 hectares of land is devoted to production of this crop. The meat of the pecan nut is, of course, consumed as food and produces the revenue to support this industry.

However, approximately 50 to 55% by weight of the pecan nut is waste material comprising principally the pecan shells and packing tissue (the packing tissue is the material between the pecan meat halves and elsewhere within the shell which is separated from the meat to provide a desirable edible product). Little use has been made of the pecan shell and packing tissue material, and it largely has represented a disposal problem. The quantity of such material is very substantial, amounting to many thousands of tons per year (in the U.S.). A small quantity of this waste has been used for horticultural mulching, glue extenders and fuel; however, this represents only a minute fraction of the total yearly quantity produced.

The present invention relates to processes and products concerned in the conversion of pecan nut waste materials to useful compositions and products.

The conversion of pecan nut waste to useful compositions and products according to the invention is believed to be proposed for the first time. There are, however, numerous references to work in the conversion of other nut wastes to useful products. For example, there is an extensive body of literature relating to cashew nut shell liquid extracts and by-products produced therefrom. See, for example, *Cashew Nut Shell Liquid Patents, Vol. I and II* published by the Cashew Export Promotion Council, Ernakylam-6, India, 1964. The situation with cashew nut shell liquid is quite different than with pecan as "Cashew nut shell liquid is a by-product obtained during the roasting of raw cashew nuts---the first stage in its processing to get the cashew kernels." (See the introduction of Volume I described above.) The problem of utilizing pecan nut waste is generally dissimilar to the situation existing with cashew nuts. The similarity is only that both would be classified as nuts from a horticultural viewpoint, and the product which may be derived in both cases may be classed as a phenol-formaldehyde resin.

Some patents representative of the state of the art are Wasserman U.S. Pat. No. 2,952,663 concerning preparing resin from cashew nut shell liquid; Leppert No. 2,985,622 concerning preparing epoxy resin compositions using cashew nut shell liquid; Eastes et al. No. 2,354,672 and Ellis, No. 2,198,378 concerning preparing resins from phenol-containing extracts derived from various plant sources. In the present invention pecan shells and packing tissue which are rejected in the pecan meat selection process are used to produce a liquid extract "pecan nut shell extract" (PNSE). The extraction of PNSE may be accomplished by grinding the pecan shells and packing tissue to approximately 40-mesh and dissolving the phenolic compounds present with water. Filtering the solution through glass wool or other suitable filter material yields the pecan nut shell extract which may be processed to form phenol formaldehyde resins and other similar materials.

Such a material may be produced by reaction of PNSE with a suitable aldehyde such as formalin (40% solution of formaldehyde in $H_2O$) in the presence of a catalyst such as hydrochloric acid, followed by drying at 100°-200° C. The composition of the material may be varied by including ground pecan shell, sawdust, or other filler material resulting in a hard, medium density product with good thermal insulation suitable for a building material. The characteristics of the by-product may also be varied by changing process conditions. Low temperature drying, for example, produces a moldable soft material with a density less than 1 resembling cork which can be molded or rolled into sheets. In addition to granular fillers, fibrous fillers such as asbestos or glass may be included in the product to achieve characteristics which such fibrous fillers are known to contribute.

Preferably, the processing of pecan nut by-products commences with collection of the waste materials resulting from the pecan nut shelling and meat separating process. This waste will include the hard external shell of the pecan nut together with the packing tissue which is a soft cork-like structure between the kernels and lining a portion of the inside of the hard shell.

It is not necessary to separate the hard shell and the packing tissue, although this may readily be done with airstream separation if desired, as there is a great difference in the density of the two materials. Furthermore, the presence of a small quantity of pecan nut meat or kernel will create no significant problem in the carrying out of the process.

It may be noted that the packing tissue will have (by weight) a greater recoverable quantity of phenolic compound by-product, although the recovery from the hard shell is also significant particularly in view of the proportionally greater weight of the hard shell material. Therefore, it should be understood that phenolic compound by-product recovery may utilize as a starting material either the hard shell alone, the packing tissue alone, or any mixture of the two including the actual mixture recovered in shelling and meat removal. Hereinafter the starting material, if not otherwise indicated, will be understood to be any of the above suggested starting materials with the natural mixture of hard shell and packing tissue preferred.

In general, the pecan nut waste will be ground to a moderately fine powder to commence the recovery process. Normally the more finely ground the material the better the recovery and the more quickly it can be carried out. Grinding to 40-mesh appears to be a practical procedure.

After grinding the pecan shell and packing tissue, it is washed with water to dissolve the water soluble phenolic compounds which are to be recovered. The resulting liquid is filtered and represents the pecan nut shell extract (PNSE) which is further processed to obtain useful products.

It is of interest to compare the characteristics of PNSE with those of the cashew nut extract which is designated CNSL (cashew nut shell liquid). PNSE contains water soluble phenolic compounds with sugar side chains. CNSL, on the other hand, is oil soluble with long side chains principally of anacardic acid, anacardal, cardanol and cardol. There is another problem with CNSL which does not exist with PNSE. In contrast to CNSL, PNSE does not become rancid, and the PNSE liquid is not highly flammable. End products produced from PNSE are generally less flammable than similar products produced with CNSL.

The process of producing a phenol formaldehyde resin proceeds by reaction of PNSE with an approximately equal volume of formalin or other suitable aldehydes in the presence of a hydrochloric acid catalyst or other suitable catalyst. A condensate is produced which is dried to produce a useful phenolic compound by-product. Drying at 100°–200° C produces a phenol formaldehyde resin (Bakelite type plastic). Plastic products are formed by extrusion of the phenol formaldehyde resin or other fabricating process. The following examples of products and processes according to the invention should be considered to be illustrative and not restrictive of the scope of the present invention.

EXAMPLE 1

Pecan nut waste including pecan shells and packing tissue is ground or crushed and screened through a 40-mesh (per inch) screen. Water-soluble phenolic compounds are removed by extraction with water, ratio of pecan shell waste to water being 5 times by weight. The liquid is filtered through glass wool to obtain PNSE.

The PNSE is reacted with formaldehyde to produce a phenolic resin, the starting products and charge ratios being:

| phenol compounds (PNSE) | 100 parts by weight |
| --- | --- |
| formalin (37% w/w) | 100 parts by weight |
| hydrochloric acid (1/10th solution in water) | 10 parts by weight |

The resin separates from the aqueous base, and when the desired degree of condensation is achieved, the water is removed by distillation or otherwise. Vacuum distillation may be employed to further remove volatiles as an optional procedure.

The phenolic resin is dried at 100°–200° C to produce a hard, brittle material similar to Bakelite plastic.

The hard plastic is finely ground to produce the phenolic resin ingredient for molding powder. It may then be combined in conventional manner with fillers, hardeners, accelerators, lubricants and other ingredients to produce a phenolic molding composition.

EXAMPLE 2

Pecan nut waste is ground or crushed and screened through a 40-mesh screen. Water-soluble phenolic compounds are removed by extraction with water, ratio of pecan shell waste to water being 5 times by weight. The liquid is filtered through glass wool to obtain PNSE.

The PNSE is reacted with formaldehyde to produce a phenolic resin, the starting products and charge ratios being:

| phenol compounds (PNSE) | 100 parts by weight |
| --- | --- |
| formalin (37% w/w) | 100 parts by weight |
| hydrochloric acid (1/10th solution in water) | 10 parts by weight |

The resin separates from the aqueous base, and when the desired degree of condensation is achieved, the water is removed by distillation or otherwise.

The phenolic resin is dried at 100°–200° C to produce a hard, brittle material similar to Bakelite plastic and finely ground (100-mesh).

The powdered phenolic resin is combined with pecan shell flour (produced by grinding pecan shells) as a filler and other ingredients for a phenolic plastic molding powder as follows:

| PNSE-derived phenolic resin powder | 100 | parts |
| --- | --- | --- |
| pecan shell flour (100-mesh) | 100 | parts |
| hexa-methylene tetramine | 12.5 | parts |
| magnesium oxide | 3 | parts |
| magnesium sterate | 2 | parts |

EXAMPLE 3

Pecan nut waste including pecan shells and packing tissue is ground or crushed and screened through a 40-mesh screen. Water soluble phenolic compounds are removed by extraction with water, ratio of pecan shell waste to water being 5 times by weight. Liquid is filtered through glass wool to obtain PNSE.

The PNSE together with a filler of sawdust or wood flour is reacted with formaldehyde to produce a filled phenolic plastic composition. The starting products and the charge ratios are:

| phenol compounds (PNSE) | 100 parts by weight |
| --- | --- |
| wood flour | 100 parts by weight |
| formalin (37% w/w) | 100 parts by weight |
| hydrochloric acid (1/10th solution in water) | 10 parts by weight |

Water is removed by distillation or otherwise and the material is dried at approximately 100° C and simultaneously or subsequently formed into a sheet. The sheet is treated with ammonium chloride as a fire retardant.

The resulting product is hard with moderately good thermal insulation properties and an electrical non-conductor. After treating with ammonium chloride, it is flame resistant.

EXAMPLE 4

The procedures are the same as Example 3 except that pecan shell ground to 80-mesh is substituted for the sawdust or wood flour filler. The resulting product is somewhat denser and less flammable.

EXAMPLE 5

Pecan nut waste including pecan shells and packing tissue is ground or crushed and screened through a 40-mesh screen. Water-soluble phenolic compounds are removed by extraction with water, ratio of pecan shell waste to water being 5 times by weight. The liquid is filtered through glass wool to obtain PNSE.

The PNSE is reacted with formaldehyde to produce a phenolic resin, the starting products and charge ratios being:

| phenol compounds (PNSE) | 100 parts by weight |
| --- | --- |
| formalin (37% w/w) | 100 parts by weight |
| sulfuric acid (1/10th solution in water) | 10 parts by weight |

The resin separates from the aqueous base, and when the desired degree of condensation is achieved, the water is removed by distillation or otherwise. Vacuum distillation may be employed to further remove volatiles as an optional procedure.

The phenolic resin is dried at 100°–200° C to produce a hard, brittle material similar to Bakelite plastic.

EXAMPLE 6

The procedures are the same as Example 5 except that starting material is pecan packing tissue separated from the pecan shell particles by air flow separation.

EXAMPLE 7

Pecan nut waste including pecan shells and packing tissue is ground or crushed and screened through an 80-mesh screen. Water-soluble phenolic compounds are removed by extraction with water, ratio of pecan shell waste to water being 5 times by weight. The liquid is filtered through glass wool to obtain PNSE.

The PNSE is reacted with formaldehyde to produce a phenolic resin, the starting products and charge ratios being:

| | |
|---|---|
| phenol compounds (PNSE) | 100 parts by weight |
| formalin (37% w/w) | 90 parts by weight |
| hydrobromic acid (1/10th solution in water) | 10 parts by weight |

The resin separates from the aqueous base, and when the desired degree of condensation is achieved, the water is removed by distillation or otherwise. Vacuum distillation may be employed to further remove volatiles as an optional procedure.

EXAMPLE 8

Pecan nut waste including pecan shells and packing tissue is ground or crushed and screened through a 40-mesh screen. Water-soluble phenolic compounds are removed by extraction with water, ratio of pecan shell waste to water being 5 times by weight. The liquid is filtered through glass wool to obtain PNSE.

The PNSE is reacted with acetaldehyde to produce a phenolic resin, the starting products and charge ratios being:

| | |
|---|---|
| phenol compounds (PNSE) | 100 parts by weight |
| acetaldehyde | 90 parts by weight |
| hydrochloric acid (1/10th solution in water) | 10 parts by weight |

The resin separates from the aqueous base, and when the desired degree of condensation is achieved, the water is removed by distillation or otherwise. Vacuum distillation may be employed to further remove volatiles as an optional procedure.

The phenolic resin is dried at 100°-200° C to produce a hard, brittle material similar to Bakelite plastic.

The hard plastic is finely ground to produce the phenolic resin ingredient for molding powder. It may then be molded in conventional manner by the addition of phenol, aldehyde and catalyst with fillers, hardeners, accelerators, lubricants and other ingredients.

EXAMPLE 9

The procedures are the same as Example 8 except the starting material is pecan packing tissue separated from the pecan shells particles by air flow separation.

EXAMPLE 10

Pecan nut waste including pecan shells and packing tissue is ground or crushed and screened through an 80-mesh screen. Water-soluble phenolic compounds are removed by extraction with water, ratio of pecan shell waste to water being 5 times by weight. The liquid is filtered through glass wool to obtain PNSE.

The PNSE is reacted with formaldehyde to produce a phenolic resin, the starting products and charge ratios being:

| | |
|---|---|
| phenol compounds (PNSE) | 100 parts by weight |
| formalin (37% w/w) | 100 parts by weight |
| hydrochloric acid (1/10th solution in water) | 10 parts by weight |

The resin separates from the aqueous base, and when the desired degree of condensation is achieved, the water is removed by distillation or otherwise. Vacuum distillation may be employed to further remove volatiles as an optional procedure.

The phenolic resin is dried at 20° C to produce a multiple soft block or sheet resembling cork, which has a density less than 1. The product is very light, without holes, is non-conductive, non-metallic and has excellent thermal insulation properties.

EXAMPLE 11

Pecan nut waste including pecan shells and packing tissue is ground or crushed and screened through a 40-mesh screen. Water-soluble phenolic compounds are removed by extraction with water, ratio of pecan shell waste to water being 5 times by weight. The liquid is filtered through glass wool to obtain PNSE.

The PNSE is reacted with formaldehyde to produce a phenolic resin, the starting products and charge ratios being:

| | |
|---|---|
| phenol compounds (PNSE) | 100 parts by weight |
| formalin (37% w/w) | 100 parts by weight |
| hydrochloric acid (1/10th solution in water) | 10 parts by weight |

The resin separates from the aqueous base, and when the desired degree of condensation is achieved, the water is removed by distillation or otherwise. Vacuum distillation may be employed to further remove volatiles as an optional procedure.

The phenolic resin is dried at 100°-200° C to produce a hard, brittle material similar to Bakelite plastic.

The above examples are illustrative only, and those skilled in the art will appreciate that there are numerous variations which can be employed in virtually innumerable combinations. While filler materials of wood flour and pecan shell flour have been specified, it will be appreciated that numerous other fillers may be substituted. Rather than finely ground wood flour (100-mesh), coarser wood particles such as sawdust (10-mesh) may be utilized. Other materials include ground asbestos, graphite, macerated paper or fabric, chopped fiber, rubber, chopped glass fiber, asbestos fiber, mica, cotton flock, or textile shreds.

The intermediate phenol resin material may also be employed to produce laminates by soaking the material to be laminated in a varnish of resin dissolved in a solvent such as alcohol. The sheets are laid up and cured by running through the rolls of the laminating press; materials which may be laminated include paper, fabric of natural or synthetic fiber, glass fiber cloth alone or in conjunction with previously mentioned laminates, wood or asbestos. A related product consists of impregnated wood produced by impregnating soft wood with a phenol resin as a concentrated solution in water which is then cured by heat.

In place of hydrochloric acid or other acids specified in the examples, substitutions from among phosphoric acid, nitric acid, hydroiodic acid, hydrobromic acid, sulfuric acid, and acetic acid may be made. Bases may also be used for a catalyst, for example, ammonia or caustic soda.

While the examples generally indicate formaldehyde as the specified reactant with the phenol-containing PNSE, numerous other aldehydes are suitable reactants and could be substituted. Among these are paraformaldehyde, acetaldehyde, propionaldehyde, butyraldehyde, benzaldehyde, glutaraldehyde and others.

The complete chemical theory of production of the phenolic resins and phenolic plastics in accordance with the present invention is not known. In spite of decades of experience and research with phenolic resins, their chemistry is not fully understood. Reference is made to *Plastic Materials* by J. A. Brydson (New Jersey: Van Nostrand Company, Inc.), 1966, Chapter 19, "Phenolic Resin"; and *Engineering Properties and Applications of Plastics*, Gilbert Ford Kinney (New York: John Wiley and Sons, Inc.), 1959.

It is believed that the chemical composition of the PNSE is basically a phenol-containing compound having linked thereto one or more organic groups (represented by R) as illustrated in three possible forms below:

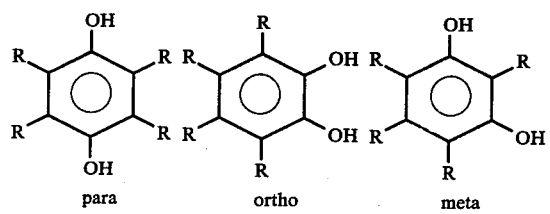

It is strongly indicated that at least some of the organic groups are sugars, but the exact composition is not known nor is the position or number of the R groups on the phenol ring.

It should be pointed out that the R groups are not anacardic acid groups as is the case with cashew nut shell liquid. This is an important factor in the distinction between the chemistry of CNSL and that of PNSE and is doubtless responsible for the fact that the PNSE is water-soluble while CNSL is not.

The polymerization process for PNSE can be better understood by reference to the formation of phenolic resin from a reaction between phenol and formaldehyde. In that reaction, two active hydrogen atoms, one from each of two phenol molecules, combine with oxygen furnished by the formaldehyde. Water is formed, which is split off, and the remainders combine to form a larger molecule. A typical reaction is illustrated below:

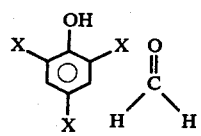

-continued

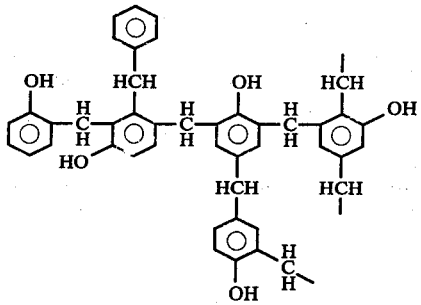

Ordinarily, such a reaction gives many different products with different molecular sizes and various attachment points and branching chains. Basically the formaldehyde molecules provide the —$CH_2$— linkages (methylene bridges) which are instrumental in creating the large molecule structure with extensive cross linking.

It is believed that the reaction of PNSE with formaldehyde (or other aldehydes) is similar except that —$CH_2$— linkages are formed at sites previously occupied by organic groups R.

While the above description of the chemical reaction is thought to be responsible for the observed production of phenolic plastic compositions, the novelty and advantages of the processes and the derived products are not attributable to the theory presented but are due to actual results established by experimentation. Accordingly, the patentability of the invention is not to be considered to be dependent on the theory presented above although the theory so far as it is known is believed to be correct.

In addition to the variations and modifications to the invention which have been described or suggested above, numerous other variations or modifications will be apparent to those skilled in the art. Accordingly, the scope of the invention is not to be deemed to be limited to the embodiments and variations described but is to be determined by reference to the appended claims.

What is claimed is:

1. A condensation product comprising a reaction product of a pecan nut shell extract and a reactant comprising an aldehyde.

2. A product as claimed in claim 1 wherein said aldehyde is formaldehyde.

3. A product as claimed in claim 1 wherein said aldehyde is selected from the group consisting of formaldehyde, acetaldehyde, propionaldehyde, butyraldehyde, benzaldehyde and glutaraldehyde.

4. A product as claimed in claim 2 wherein the volume of said concentrated pecan nut shell extract is about equal to the volume of said reactant, said reactant comprising a 40% solution of formaldehyde in water.

5. A product as claimed in claim 1 wherein the product is a resin-like substance comprising concentrated extracts of the shell of the pecan nut.

6. A product as claimed in claim 1 wherein the product is a resin-like substance containing the concentrated extracts of the packing tissue of the pecan nut.

7. A product as claimed in claim 1 wherein the product is a resin-like substance comprising the concentrated extracts of both the shell and the packing tissue of the pecan nut.

8. A product as claimed in claim 7 wherein said aldehyde is formaldehyde.

9. The method of producing a composition of matter comprising the steps of reacting pecan nut shell extracts and an aldehyde followed by removing water.

10. The method of claim 9 in which the aldehyde is formaldehyde.

11. The method of claim 9 in which the aldehyde is taken from a group consisting of formaldehyde, paraformaldehyde, acetaldehyde, propionaldehyde, butyraldehyde, benzaldehyde, and glutaraldehyde.

12. The method of claim 9 wherein said pecan nut shell extracts include pecan nut packing tissue extracts.

13. The method of claim 9 wherein said reaction step is performed by heating to a temperature of from 100° C to 200° C together with a concentrated acid in a quantity of at least 1% of total volume.

14. The method of claim 9 wherein said aldehyde is a solution of approximately 40% formaldehyde in water and said solution is about equal in volume to that of said pecan nut shell extract.

15. The method of claim 13 wherein said aldehyde is a solution of approximately 40% formaldehyde in water and said solution is about equal in volume to that of said pecan nut shell extract.

16. The method of claim 15 wherein said acid is concentrated hydrochloric acid and its quantity is about 5% of the total volume of the reactants mixture.

17. The method of claim 9 wherein the product is a synthetic resin and further including the steps of finely grinding the product of the first reaction, adding a filler material, an acid, a phenol and an aldehyde, and heating to produce a filled phenolic resin plastic.

18. A resinous composition which is the product of reacting PNSE with an aldehyde in the presence of an acid catalyst and drying to produce a solid material.

19. The composition of claim 18 in which said aldehyde is formaldehyde.

20. The composition of claim 18 in which said acid is hydrochloric acid.

21. The composition of claim 20 in which said aldehyde is formaldehyde.

22. The composition of claim 21 in which the drying is at a temperature of 100°–200° C.

23. The composition of claim 21 in which the drying is at a temperature of less than 100° C.

24. The composition of claim 18 in which the drying is at a temperature of 100°–200° C.

25. The composition of claim 18 in which the drying is at a temperature of less than 100° C.

* * * * *